US011546723B2

(12) United States Patent
Makkiya et al.

(10) Patent No.: US 11,546,723 B2
(45) Date of Patent: Jan. 3, 2023

(54) SYSTEMS AND METHODS TO ADAPTIVELY REDEFINE A GEOFENCE

(71) Applicant: Ford Global Technologies, LLC, Dearborn, MI (US)

(72) Inventors: Hussam Makkiya, Dearborn, MI (US); Elena Ilieva, Bloomfield Hills, MI (US); Luis Chaboya, New Hudson, MI (US); Colin Drummond, Windsor (CA); Candice Villanueva, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/394,307

(22) Filed: Aug. 4, 2021

(65) Prior Publication Data

US 2022/0116735 A1  Apr. 14, 2022

Related U.S. Application Data

(62) Division of application No. 17/066,213, filed on Oct. 8, 2020, now Pat. No. 11,190,901.

(51) Int. Cl.
*H04W 4/021* (2018.01)
*H04W 4/40* (2018.01)

(52) U.S. Cl.
CPC ............. *H04W 4/021* (2013.01); *H04W 4/40* (2018.02)

(58) Field of Classification Search
CPC ....... H04W 4/02; H04W 4/022; H04W 4/023; H04W 60/04; H04W 56/005;
(Continued)

(56) References Cited

U.S. PATENT DOCUMENTS 10,506,365 B1\* 12/2019 Mahapatra ............ H04W 4/022
2004/0102896 A1\* 5/2004 Thayer .................. G08G 1/207
340/988

(Continued)

OTHER PUBLICATIONS

Kreis et al, "The North American Transportation Security Center Technology Prototype Gap Analysis Research Report KTC-10-31/FD03-1F", Kentucky Transportation Center, May 2009, 93 pages.

*Primary Examiner* — Dung Hong
(74) *Attorney, Agent, or Firm* — Brandon Hicks; Eversheds Sutherland (US) LLP

(57) ABSTRACT

The disclosure generally pertains to systems and methods to minimize false alerts in a geofence system. In an example embodiment, a controller may receive location information of a vehicle traveling on a road that is substantially aligned with a segment of a geofence. The controller may identify a margin of error present in the location information and redefine the segment of the geofence based on the margin of error. The controller may then detect geofence violations with respect to the redefined segment of the geofence. In another example embodiment, a controller may receive location information of a vehicle. The controller may evaluate the location information and determine that the vehicle is crisscrossing a segment of a geofence while traveling on a road. The controller minimizes nuisance geofence exit alerts by redefining the geofence so as to include a geofence buffer zone that encompasses the crisscrossing travel path of the vehicle.

12 Claims, 8 Drawing Sheets

(58) Field of Classification Search
CPC ... H04W 4/029; H04W 64/00; H04W 64/003; H04W 64/006; H04W 4/021; H04W 4/026; H04W 4/027; A63B 2220/20
See application file for complete search history.

(56) References Cited

U.S. PATENT DOCUMENTS

| | | | |
|---|---|---|---|
| 2008/0162034 A1* | 7/2008 | Breen | G01C 21/3461 |
| | | | 701/533 |
| 2009/0082139 A1* | 3/2009 | Hart | A63B 24/0003 |
| | | | 473/409 |
| 2009/0088924 A1 | 4/2009 | Coffee et al. | |
| 2012/0112897 A1* | 5/2012 | Oh | B60R 25/1012 |
| | | | 340/439 |
| 2017/0055124 A1 | 2/2017 | Staton et al. | |
| 2020/0336861 A1* | 10/2020 | McCutchin | H04W 4/022 |

\* cited by examiner

SYSTEMS AND METHODS TO ADAPTIVELY REDEFINE A GEOFENCE

CROSS-REFERENCE TO RELATED APPLICATIONS

The present application claims priority to, the benefit of, and is a divisional application of U.S. patent application Ser. No. 17/066,213, filed Oct. 8, 2020, which is hereby incorporated by reference herein in its entirety.

BACKGROUND

A geofence is an invisible fence that is created by using technology in order to obtain location coordinates of a moving object and to use the location coordinates to detect, among other things, an excursion of the moving object outside of the geofence. The location coordinates of the vehicle may be obtained by using various kinds of devices and technologies, such as, for example, by using a global positioning system (GPS) device disposed within the vehicle. The GPS device may communicate location information of the vehicle (either when stationary or when in motion) to a monitoring device that examines the location information with respect to location coordinates of the geofence in order to determine whether the vehicle is located inside the geofence. If the monitoring device determines that the vehicle has moved outside the geofence, an alert may be provided to one or more entities, such as, for example, an occupant of the vehicle or to a monitoring service.

The location coordinates of the vehicle may be transmitted from the vehicle to the monitoring device via a communication medium, such as, for example, a cellular system or a WiFi system. The accuracy of the location information provided by the vehicle may not only depend on the GPS device but may further depend on the communication medium as well. More particularly, a signal strength and/or availability of GPS signals received by the GPS device can vary from one location to another. For example, in some areas, some of the GPS signals may be blocked by tall buildings or trees. A cellular signal may be similarly affected, thereby leading to corruption of the location information received by the monitoring device. Such issues, particularly in cases where the vehicle is traveling close to the geofence, may lead to generation of false alerts. The false alerts can be very annoying to a driver of the vehicle or to other entities receiving the false alerts. It is therefore desirable to provide solutions that address such issues that may be associated with geofence operations.

DESCRIPTION OF THE FIGURES

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems and methods disclosed herein generally pertain to minimizing false alerts in a geofence system. In an example embodiment, a geofence controller may receive location information of a vehicle traveling on a road that is substantially aligned with a segment of a geofence. The controller may identify a margin of error present in the location information and redefine the segment of the geofence based on the margin of error. The controller may then detect geofence violations with respect to the redefined segment of the geofence. In another example embodiment, a geofence controller may receive location information of a vehicle traveling on a road. The controller may evaluate the location information and determine that the vehicle is criss-crossing a segment of a geofence while traveling on the road. The controller may minimize nuisance Geofence entrance/exit alerts by redefining the geofence so as to include a geofence buffer zone to accommodate the road.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionalities described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Certain words and phrases are used herein solely for convenience and such words and terms should be interpreted as referring to various objects and actions that are generally understood in various forms and equivalencies by persons of ordinary skill in the art.

Figure 1:
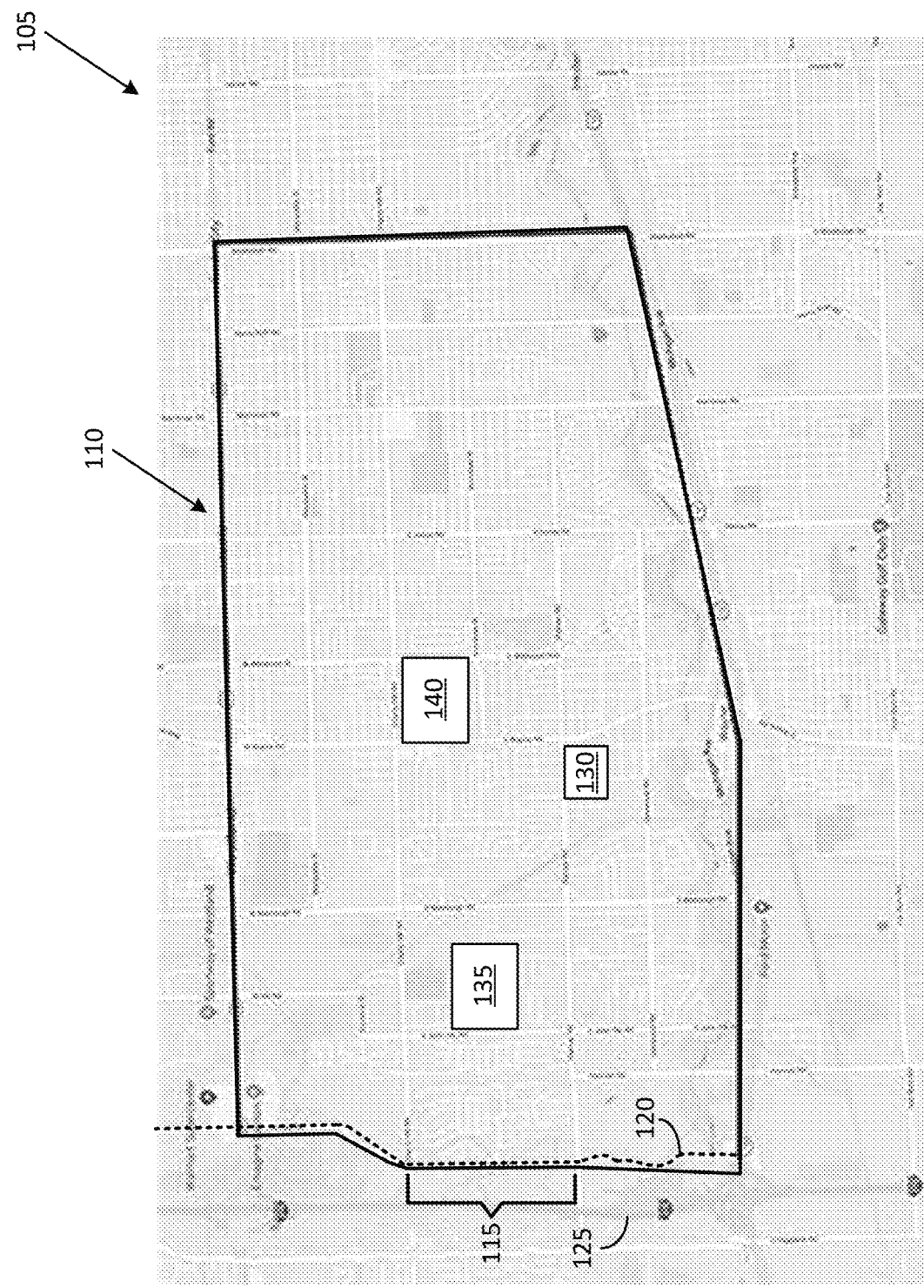
FIG. 1 shows an example map that includes a geofence in accordance with an embodiment of the disclosure.

FIG. 1 shows an example map 105 that includes a geofence 110 in accordance with an embodiment of the disclosure. In this example implementation, the geofence 110 is a polygonal geofence that may be deployed by any of various entities, such as for example, an automobile dealership 140 or an individual residing in a residence 130. The management of the automobile dealership 140 may use a geofence controller to configure the geofence 110 so as allow a potential customer to test drive a vehicle on the roads and streets close to the dealership and to ensure that a vehicle is not stolen when taken out for a test drive. The geofence controller may be a computer located on the premises of the automobile dealership and/or a computer that is located elsewhere (at a company headquarters, for example) and communicatively coupled to the computer at the dealership. Communications between the two computers may take place through a network, such as the Internet, for example.

In the case of the individual, the geofence 110 may be utilized by a parent to ensure that a teenager limits his/her travel to a school 135 nearby but does not take the family car for a joy ride, especially for a joy ride on the highway 125. Towards this end, the parent may configure the geofence 110 in such a manner that allows the teenager to travel on the road 120 but not cross the geofence 110 and approach the highway 125. In this scenario, the geofence 110 may be configured by the parent on a home computer located at the residence 130 and/or on a vehicle computer of the family car that is driven by the teenager.

In an example implementation, a segment 115 of the geofence 110 runs parallel to a straight stretch of the road 120 and is provided between the road 120 and the highway 125 in such a way as to allow the teenager to travel on the road 120 but not on the highway 125. The road 120 is curved at other places and the geofence 110 stretches alongside the road 120 in alignment with the curved portions.

If the teenager were to drive out of the geofence 110 at any spot, a geofence exit alert is automatically generated and transmitted to one or more devices such as, for example, the vehicle computer, the home computer, an infotainment system in the vehicle, and/or a smartphone carried by the parent. The geofence exit alert may be provided in the form of a voice message that informs the teenager that the vehicle has violated the geofence 110 and that the teenager should turn around and head back into the geofenced area. The geofence exit alert provided to the parent may be, for example, an audible beep, a text message, and/or an email to inform the parent that the teenager has violated the geofence 110.

It will be pertinent to point out that a portion of the geofence 110, and particularly the segment 115, may be described in this disclosure as being "substantially aligned" with the road 120. As such, the phrase "substantially aligned" should be understood to indicate that all portions of the geofence 110 are equidistant from the road 120, irrespective of the shape of the road 120. Consequently, the segment 115 may run parallel to a straight portion of the road 120 in some places and may run equidistant from a curved portion of the road 120 in some other places.

Figure 2:
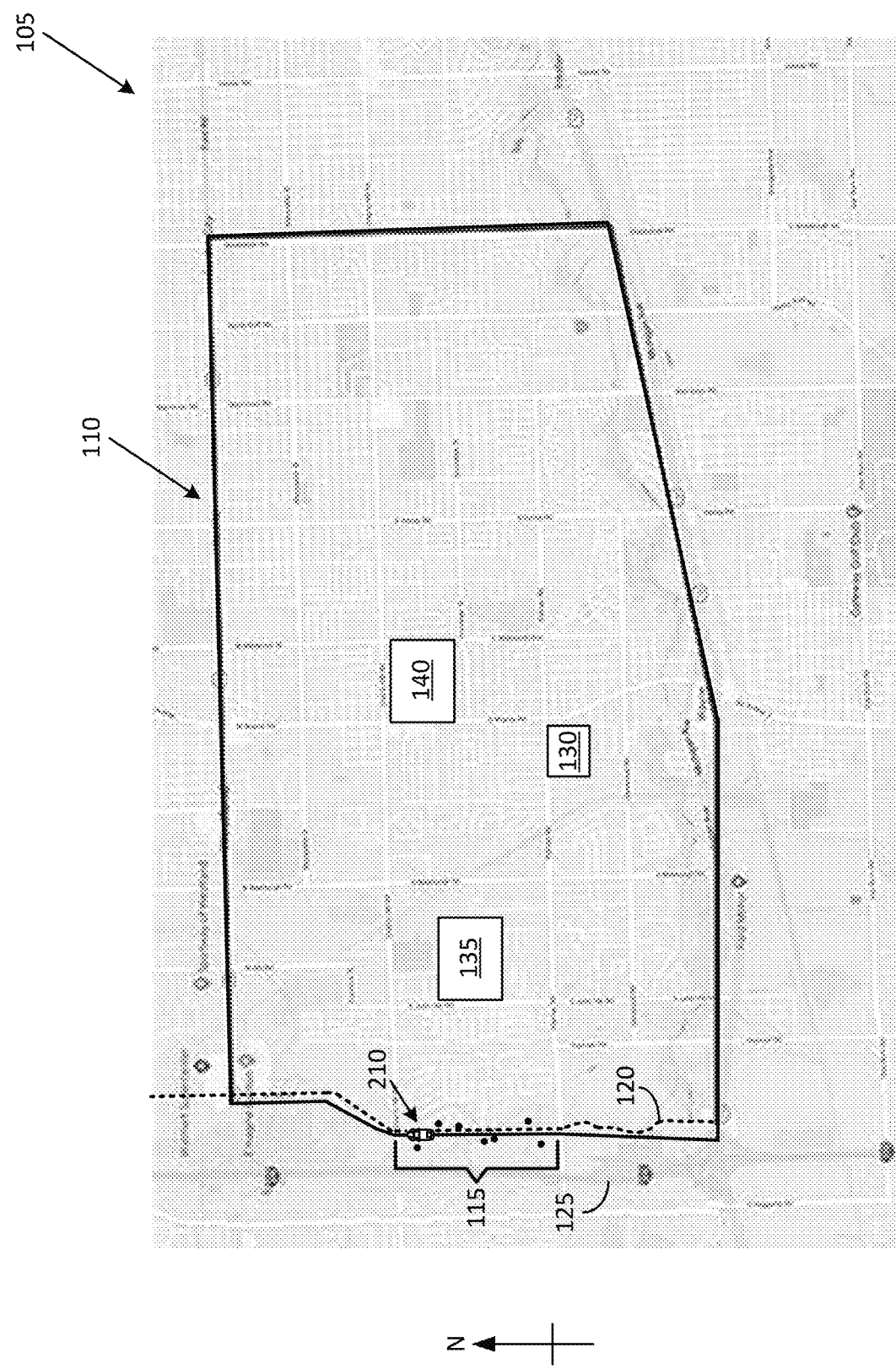
FIG. 2 illustrates a first example scenario associated with a geofence that may lead to generation of false geofence violation alerts.

FIG. 2 illustrates a first example scenario associated with the geofence 110 that may lead to generation of false geofence violation alerts. In this example scenario, a potential customer of the automobile dealership 140 has taken a vehicle 210 for a test drive on the road 120. Sales staff at the automobile dealership 140 may have informed the potential customer of the geofence 110 and also informed him/her that it is permissible to drive on the straight stretch of the road 120 as long as the potential customer does not get off the road 120 and head towards the highway 125.

The vehicle 210 may include a vehicle computer that is configured to continuously transmit location information of the vehicle 210 to the geofence controller in the automobile dealership 140. In this example, the vehicle computer may be configured as a cellular node that communicates with cell towers in the vicinity of the road 120. Geolocation techniques, such as triangulation of cellular signals, may be used to determine the location of the vehicle 210 at any given time as the vehicle 210 travels on the road 120. The cell towers may be owned and operated by a cellular service provider that cannot afford to install a large number of cell towers in the area near the road 120. Consequently, signal coverage may be spotty and/or inaccurate and the location coordinates derived by the vehicle computer by using the cell towers may lack adequate accuracy. Other factors, such as software issues and hardware components in the vehicle computer, may also adversely affect the accuracy of the location coordinates. As a result, the geofence controller in the automobile dealership 140 may receive the location coordinates of the vehicle 210 and erroneously conclude that the vehicle 210 has traveled off the road 120 at various instants, and has violated the geofence 110 at the segment 115. The various location coordinates of the vehicle 210 that are erroneous are shown in FIG. 2 as dots that straddle the road 120.

Figure 3:
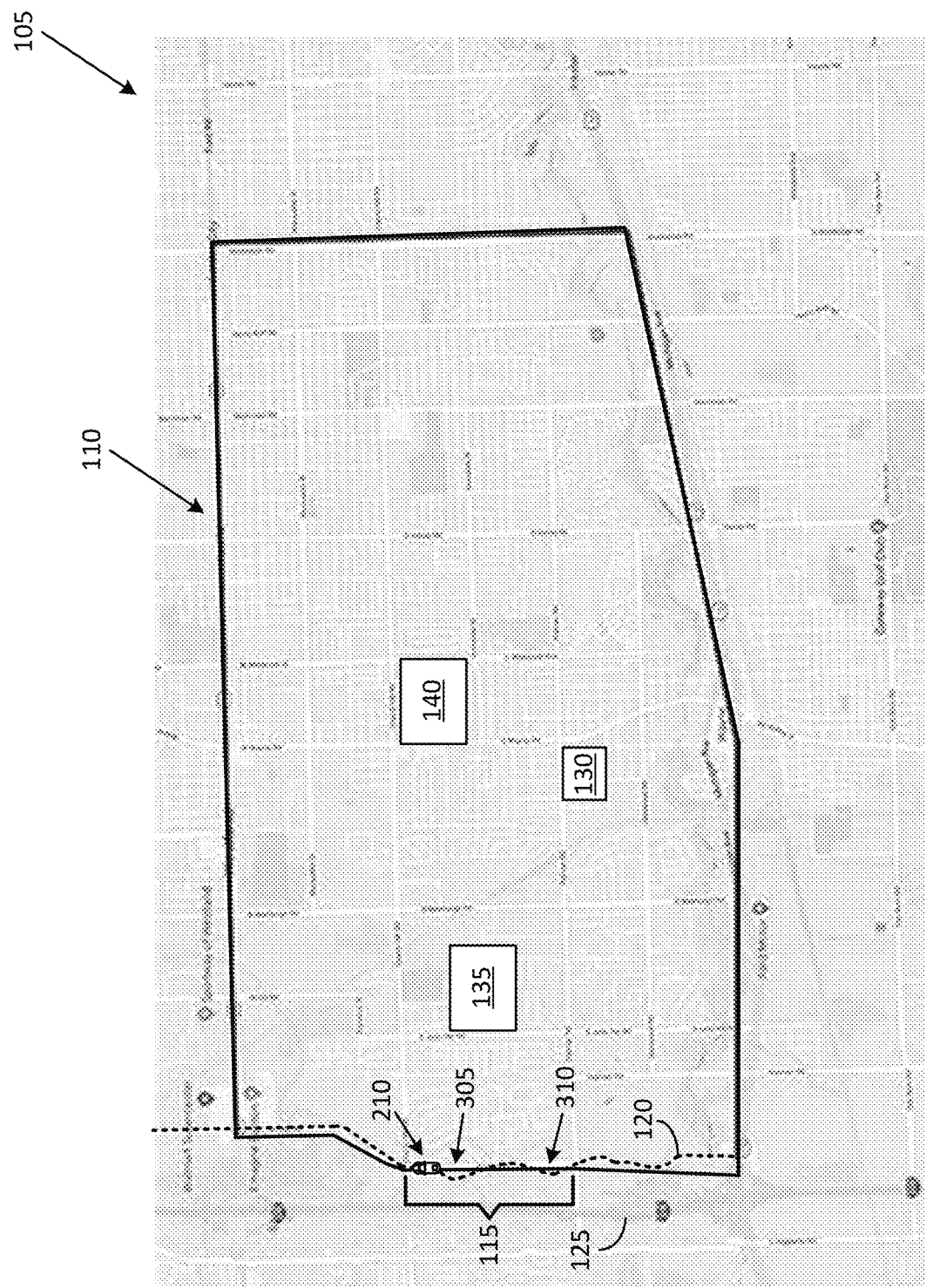
FIG. 3 illustrates a second example scenario associated with a geofence that may lead to generation of false geofence violation alerts.

FIG. 3 illustrates a second example scenario associated with the geofence 110 that may lead to generation of false geofence violation alerts. In this example scenario, the segment 115 of the geofence 110 has been poorly defined and does not encompass the stretch of road 120 in an adequate manner. More particularly, various portions of the road 120, such as, for example, a first portion 305 and a second portion 310, extend outside the segment 115 of the geofence 110. Location coordinates transmitted by the vehicle computer of the vehicle 210 may be evaluated by the geofence controller in the automobile dealership 140 and geofence exit alerts generated whenever the vehicle 210 travels on portions, such as the first portion 305 and the second portion 310, that lie outside the segment 115 of the geofence 110. The geofence alerts may be treated as nuisance geofence exit alerts that may not only annoy the driver of the vehicle 210 but may also cause the geofence controller at the automobile dealership 140 to disregard genuine geofence exit alerts in some cases.

Figure 4:
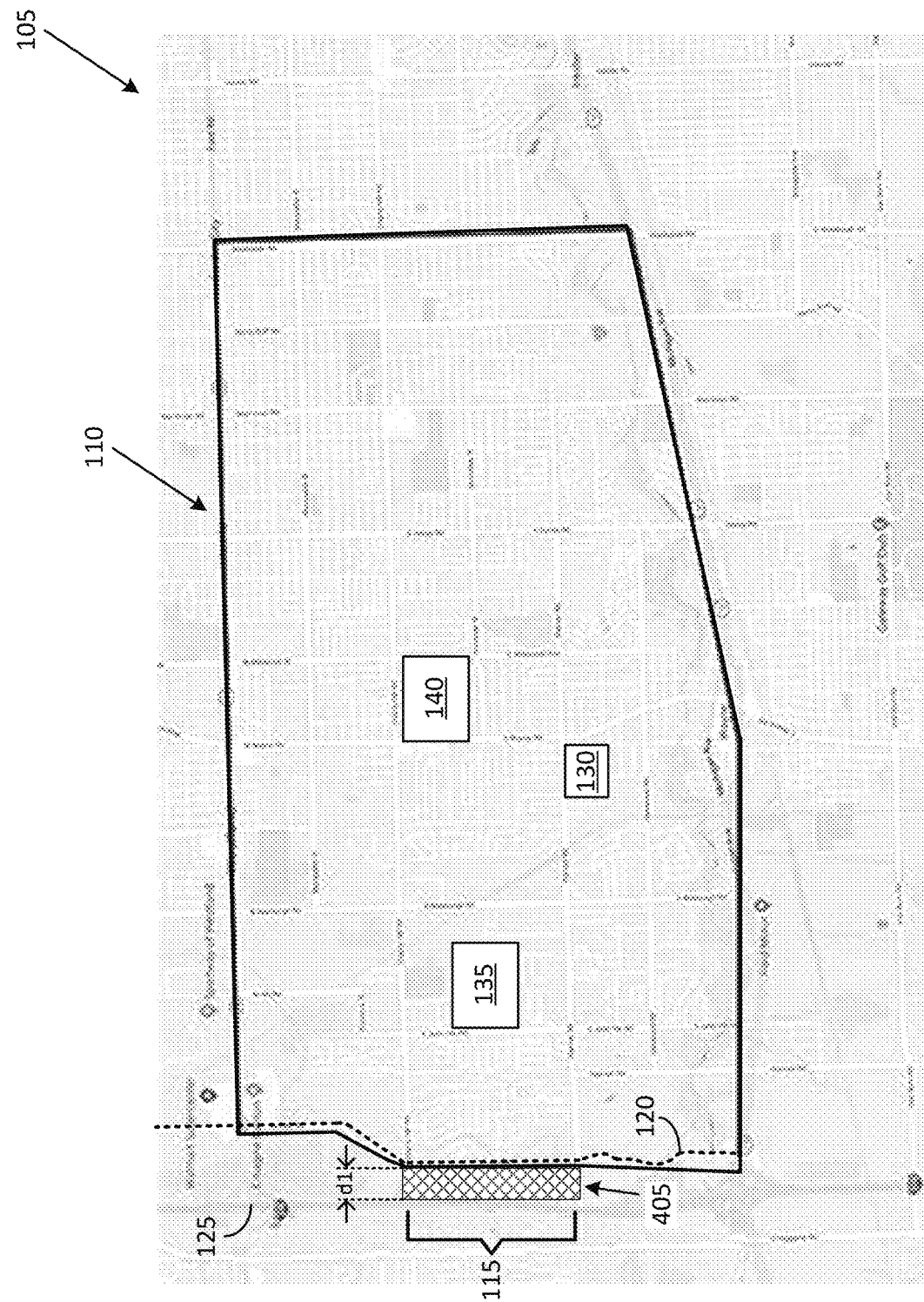
FIG. 4 illustrates a first example geofence buffer zone that may be used for minimizing false geofence exit alerts, in accordance with an embodiment of the disclosure.

FIG. 4 illustrates a first example geofence buffer zone 405 that may be deployed for minimizing false geofence exit alerts, in accordance with an embodiment of the disclosure. In an example procedure in accordance with the disclosure, a geofence controller such as, for example, the geofence controller in the automobile dealership 140, may receive location information of the vehicle 210 traveling on the road 120 and may identify a margin of error present in the location information.

The margin of error may be identified in various ways such as, for example, by executing a calibration procedure and/or by using historical data. The calibration procedure may involve comparing a set of location coordinates measured using a first technique (such as, for example, a triangulation technique using cellular signals) against location coordinates measured using a second technique (such as, for example, using GPS technology). The measurements may be carried out for various locations such as, for example, the ones indicated by dots in FIG. 2.

In another procedure, historical data such as, for example, location information provided by a number of vehicles traveling on the road 120 over a period of time (a year, for example) may be analyzed to generate reference location data. The reference location data may be used to evaluate current location information received from a vehicle, such as, for example, the vehicle 210, and determine the margin of error (if present) in the received location information.

The geofence controller may redefine the segment 115 of the geofence 110 on the basis of the margin of error present in the location information provided by the vehicle 210. In one embodiment in accordance with the disclosure, redefining the segment 115 of the geofence 110 is carried out by providing the geofence buffer zone 405. The geofence buffer zone 405 may minimize or eliminate false geofence exit alerts by disregarding location information received from the vehicle 210 when the vehicle 210 is traveling inside the geofence buffer zone 405.

Various characteristics of the geofence buffer zone 405 may be selected on the basis of the margin of error. One characteristic may be the distance "d1" to which the geofence buffer zone 405 extends from the segment 115. The distance "d1" can be smaller in one case where the margin of error in the location information is low compared to another case where the margin of error in the location information is high. The distance "d1" may be further selected on the basis of other considerations, such as, for example, an acceptable number of false geofence exit alerts.

The description above refers to providing a geofence buffer zone 405 based on location information received from the example vehicle 210. In accordance with the disclosure, such geofence buffer zones can be provided dynamically for other vehicles as well, on a vehicle-to-vehicle basis. Thus, for example, a geofence buffer zone with a different set of characteristics (such as, for example, a different distance instead of "d1") may be provided and applied to another vehicle that travels on the same section of road 120 (adjacent to the segment 115) and transmits to the geofence controller, location information with a different level of accuracy. This vehicle may be, for example, a newer vehicle that uses more sophisticated equipment and/or techniques to generate location information.

In another example procedure in accordance with the disclosure, a geofence controller such as, the geofence controller in the automobile dealership 140, may receive location information of the vehicle 210 traveling on the road 120. The geofence controller may evaluate the location information and determine that the vehicle 210 is crisscrossing the segment 115 of the geofence 110 (as illustrated in FIG. 3) over a period of time. The period of time over which the geofence controller observes the vehicle crisscrossing the segment 115 may be based on various factors such as, for example, a speed of the vehicle 210, a traffic density on the segment 115, a time of day, a time of year (seasonal), a history of genuine geofence exit alerts of the vehicle 210, a history of nuisance geofence alerts of the vehicle 210, a history of genuine geofence exit alerts by other vehicles, and/or a history of nuisance geofence alerts by other vehicles.

The crisscrossing can be caused due to various reasons. One reason may be attributable to the geofence 110 being poorly defined and failing to encompass the stretch of road 120 in an adequate manner. Another reason may be attributable to a margin of error in the location coordinates provided by the vehicle 210. Yet another reason may be attributable to the vehicle 210 being driven on a side road or an access road beside the road 120 and/or because the driver exits the road 120 for stopping at places, such as restaurants, stores, or gas stations. The geofence controller may redefine the segment 115 of the geofence 110 on the basis of one or more of such reasons. The redefining may be carried out by providing the geofence buffer zone 405.

Figure 5:
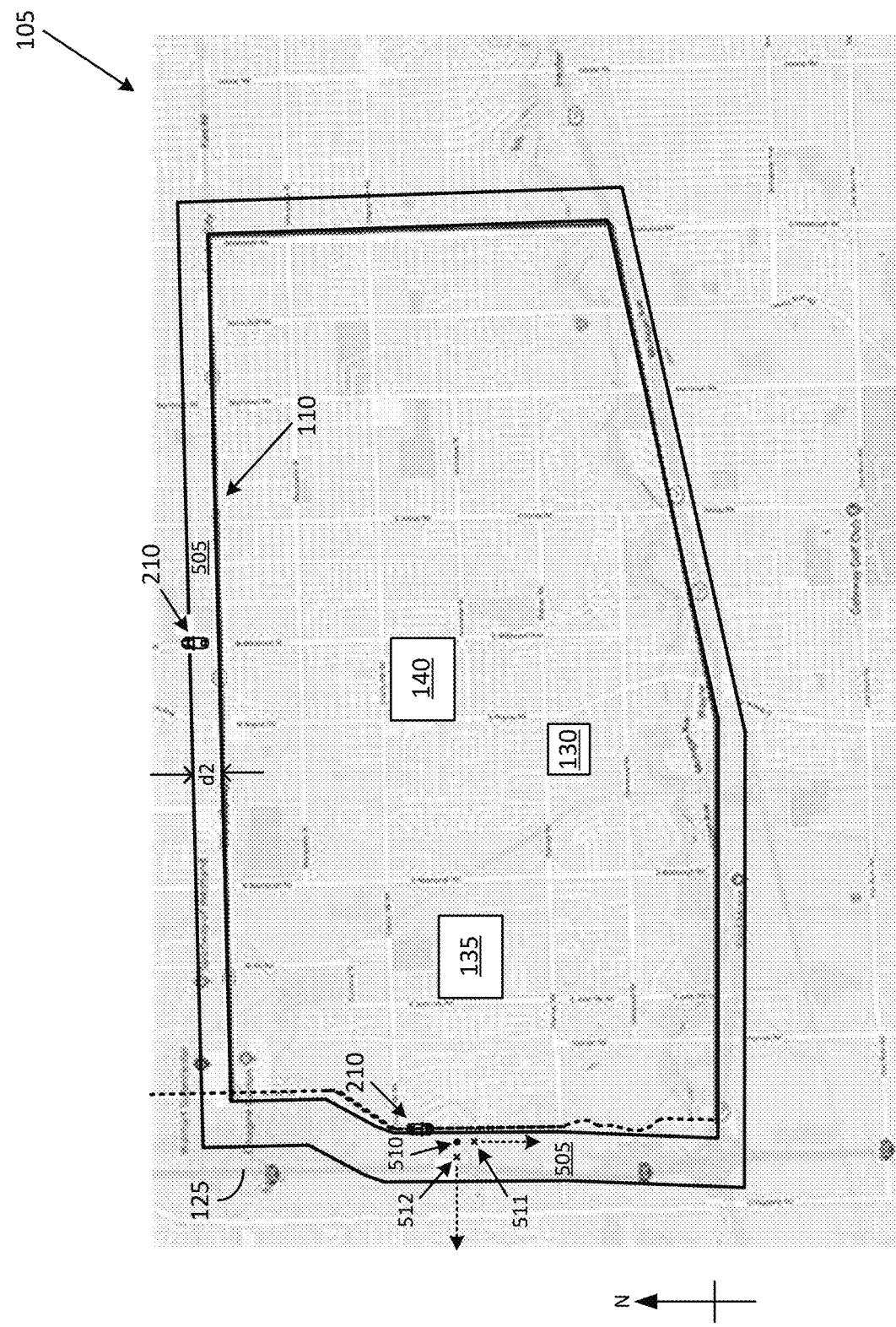
FIG. 5 illustrates a second example geofence buffer zone that may be used for minimizing false alerts, in accordance with an embodiment of the disclosure.

FIG. 5 illustrates a second example geofence buffer zone 505 that may be used for minimizing false alerts, in accordance with an embodiment of the disclosure. In some cases, it may be preferable to use the geofence buffer zone 505 instead of the geofence buffer zone 405 because the geofence buffer zone 405 is limited to an area that extends away from the segment 115 of the road 120. In this embodiment however, the geofence buffer zone 505 is provided all around the geofence 110. More particularly, in this implementation, a periphery of the geofence buffer zone 505 is arranged to uniformly extend to a distance "d2" away from the geofence 110 (i.e., the geofence buffer zone 505 is shaped as a larger polygon that is identical in shape to the geofence 110).

In another implementation, the periphery of the geofence buffer zone 505 may have a polygon shape that is different than the polygon shape of the geofence 110 and may have different extension distances at different spots along the geofence 110. In yet another implementation, the periphery of the geofence buffer zone 505 may have an irregular shape that is different than the polygon shape of the geofence 110.

The geofence controller may refrain from issuing a geofence exit alert as long as a vehicle, such as the vehicle 210, remains inside the geofence 110 or inside the geofence buffer zone 505. A geofence exit alert may be generated when the vehicle 210 travels outside the geofence buffer zone 505 and is located at a distance greater than the distance "d2" from the geofence 110. In some cases, minimizing nuisance alerts may be carried out by applying various types of confirmation procedures for confirming that the vehicle 210 has traveled outside the geofence buffer zone 505 intentionally and not as a result of a temporary foray such as, while making a small detour around a site of an accident on a road. (These confirmation procedures may also be applied to the geofence buffer zone 405 in the embodiment described above).

In a first example confirmation procedure, the geofence controller may set a timing delay after the vehicle 210 has traveled outside the geofence buffer zone 505. The timing delay can be determined on the basis of various factors as, for example, a density of traffic at the violation site, a presence of an accident at the violation site, a time of day of the violation, and/or a time of year of the violation (snow, ice, flood etc.). In one example case, a duration of the timing delay is set on the basis of a sampling process. In a first sampling process, the geofence controller evaluates location information of the vehicle 210 at a first time and determines that the vehicle 210 has traveled outside the geofence buffer zone 505. The geofence controller then pauses for some time to allow the vehicle 210 to travel some more before evaluating location information of the vehicle 210 at a subsequent time. If the location coordinates are located outside the geofence buffer zone 505 at this subsequent time as well, the geofence controller concludes that the vehicle 210 has indeed traveled outside the geofence buffer zone 505. The overall timing delay in this example, includes the first time and the subsequent time at which the location coordinates were evaluated. For example, if the first time is referred to as t=0 and the subsequent time is t=15 minutes, the overall timing delay is 15 minutes. More than two sampling instants may be used in other cases.

In a second example confirmation procedure, the geofence controller determines whether the vehicle 210 has traveled outside a geofence buffer zone 505 by analyzing location information of the vehicle 210 at various instants in time. In an example case, the geofence controller receives a first set of location coordinates that indicates that the vehicle 210 is at a first location outside the geofence buffer zone 505. The geofence controller subsequently receives a second set of location coordinates that indicates that the vehicle 210 is at a second location outside the geofence buffer zone 505. The geofence controller may analyze the two locations to identify a path of travel of the vehicle 210 such as, for example, whether the vehicle 210 is consistently traveling away from the geofence buffer zone 505 or is turning back after initially traveling away from the geofence buffer zone 505 (zigzagging, for example).

In an example implementation, a path of travel of the vehicle 210 may be determined by comparing a first set of location coordinates corresponding to a first location 510, with location coordinates of a second location, which could, for example, be either a location 511 or a location 512, based on an intent of the driver of the vehicle 210. If the vehicle 210 moves from the first location 510 to the location 511, the geofence controller may conclude that the driver is intending to travel in a direction that is generally headed south and is not attempting to violate the geofence. In this situation, the geofence controller may desist from issuing a geofence exit alert even if the vehicle 210 moves outside the geofence buffer zone 505, as long as the vehicle 210 is generally heading south, thereby indicating that the driver is not intending to wantonly violate the geofence.

Alternatively, if the vehicle 210 moves from the first location 510 to the location 512, the geofence controller may conclude that the driver may be wantonly intending to exit the geofence. The geofence controller may confirm the intent of the driver by determining that the vehicle 210 is subsequently at a third location that is even further west of the location 512. If such a situation were to occur, the geofence controller may issue a geofence exit alert when the vehicle 210 moves outside the geofence buffer zone 505.

The geofence controller may identify the path of travel of the vehicle 210 by using various techniques such as, for example, GPS coordinate tracking and/or compass headings. The geofence controller may also identify the path of travel of the vehicle 210 by using analytical and/or mathematical techniques such as, for example, averaging, path prediction, and/or historical data in order to determine if the vehicle 210 has violated the geofence.

Figure 6:
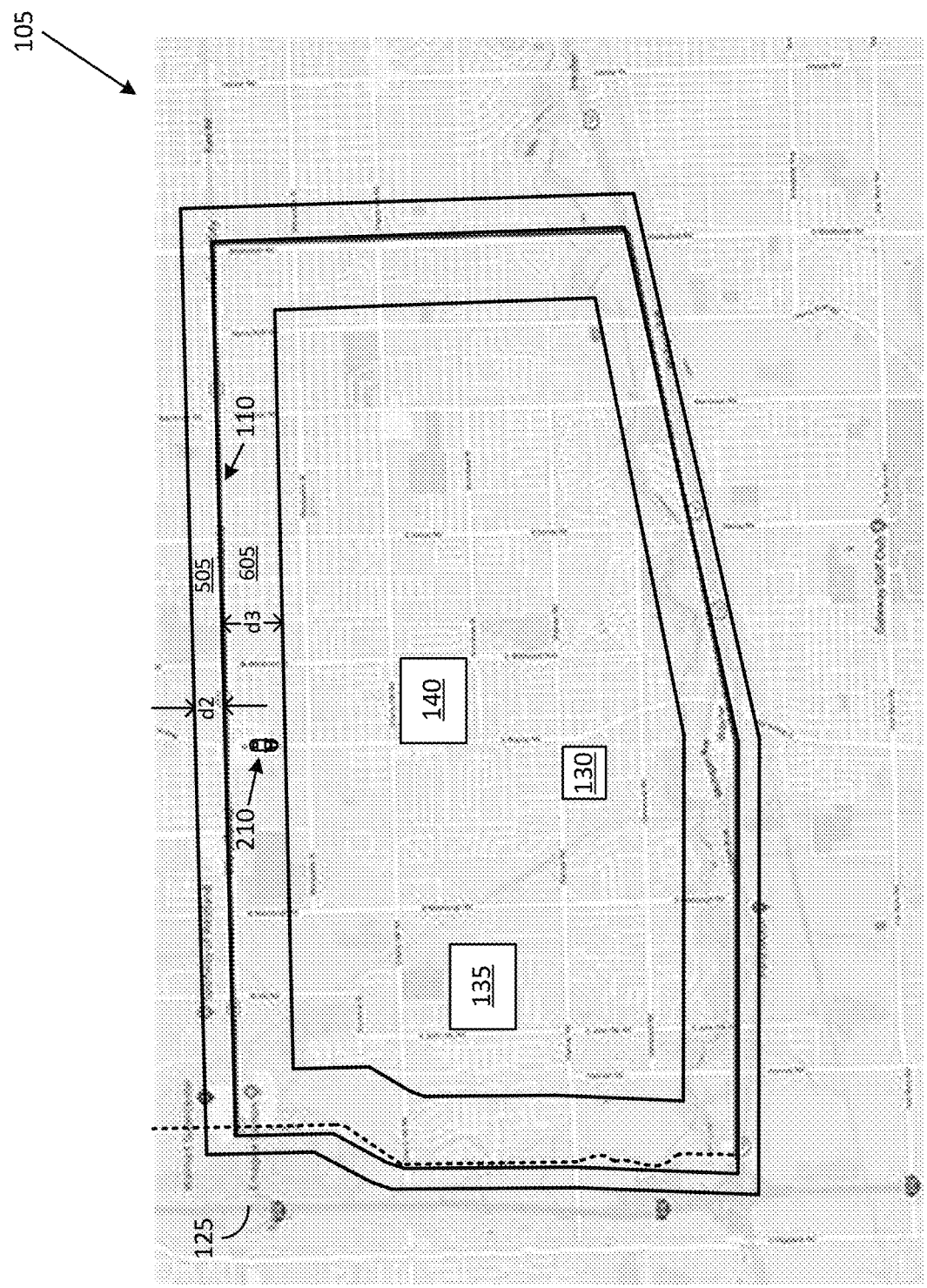
FIG. 6 illustrates an example geofence buffer zone that may be used for confirming that a vehicle has re-entered the geofenced area.

FIG. 6 illustrates a third example geofence buffer zone 605 that may be used in accordance with an embodiment of the disclosure for confirming that the vehicle 210 has re-entered the geofenced area. The geofence buffer zone 605 uniformly extends to a distance "d3" inward from the geofence 110 (i.e., the inner periphery of geofence buffer zone 605 is shaped as a smaller polygon that is identical in shape to the geofence 110). In another implementation, the inner periphery of the geofence buffer zone 605 may have a polygon shape that is different than the polygon shape of the geofence 110 or may an irregular shape that is different than the polygon shape of the geofence 110. The distance "d3" can be identical to the distance "d2" in some implementations, and different in others (less than or greater than "d2").

In one embodiment in accordance with the disclosure, the distance "d3" and/or the distance "d2" are selected to provide a hysteresis configuration whereby a geofence re-entry alert is issued by the geofence controller only after the vehicle 210 has travelled a greater distance inwards (when re-entering the geofence 110) in comparison to a distance traveled outwards out of the geofence 110 (when exiting the geofence 110).

In an example procedure to detect whether the vehicle 210 has re-entered the geofence buffer zone 505 after traveling outside the geofence buffer zone 505. At this time, the geofence controller desists from issuing a geofence re-entry alert even though the vehicle 210 is now inside the geofence buffer zone 505. Desisting from issuing the geofence re-entry alert at this time may minimize issuing of geofence alerts because it may be unclear if the vehicle 210 may be traveling in a zig-zag manner and may move back outside the geofence buffer zone 505. The geofence controller then continues to evaluate location information of the vehicle 210 to determine whether the vehicle has crossed the periphery of the geofence 110 and is moving inwards inside the geofence buffer zone 605. Here again, the geofence controller desists from issuing a vehicle re-entry alert even though the vehicle has traveled a distance that is greater than "d2" (corresponding to the geofence buffer zone 505). The geofence controller issues a vehicle re-entry alert when the vehicle 210 continues moving inwards and has traveled an additional distance "d3" (corresponding to the geofence buffer zone 605). In an example implementation, the geofence controller may also track a direction of movement of the vehicle 210 so as to make a determination whether the vehicle 210 is exiting the geofence 110, re-entering the geofence 110, or moving in a different direction with respect to the geofence 110.

Figure 7:
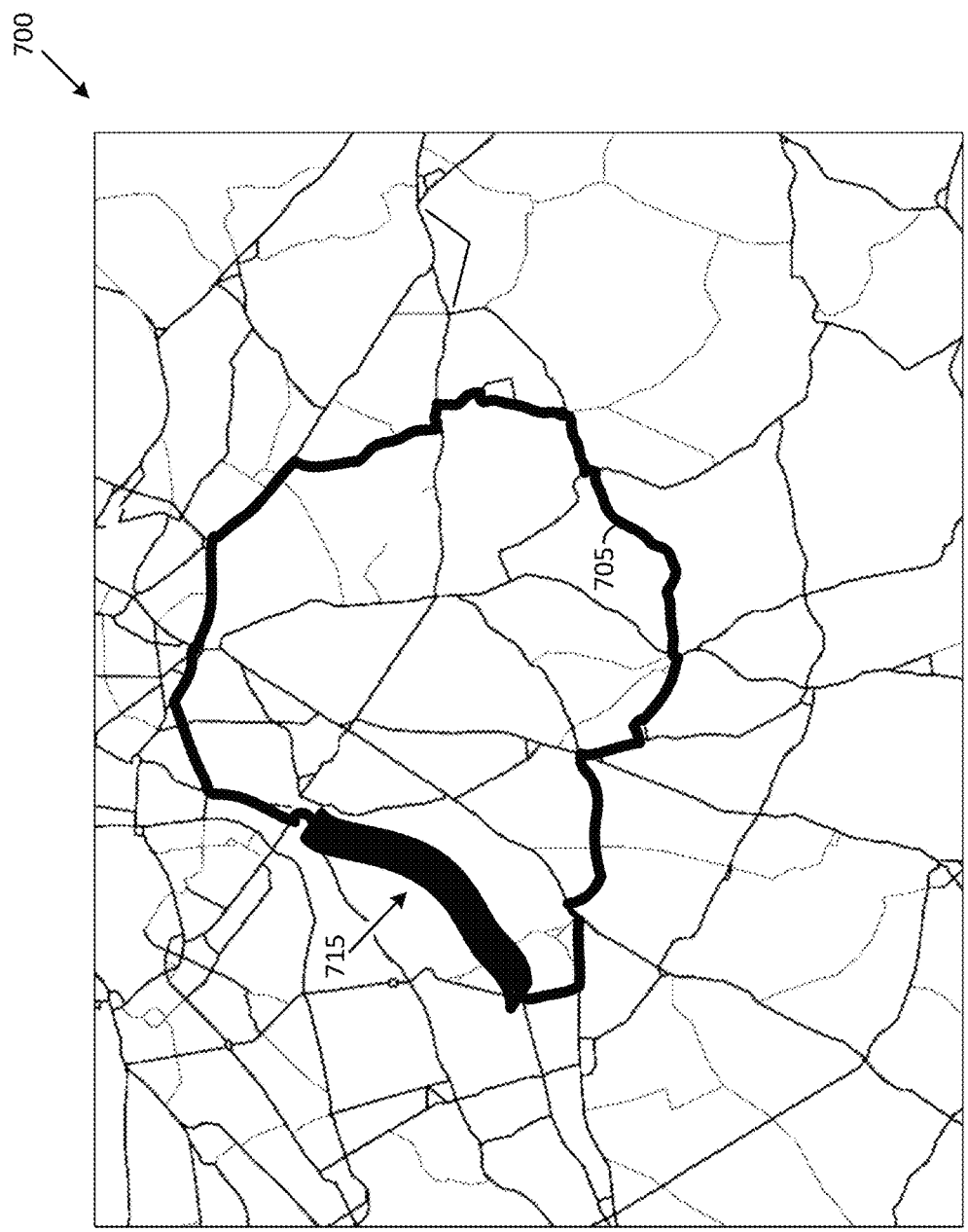
FIG. 7 shows another example map that includes a geofence in accordance with an embodiment of the disclosure.

FIG. 7 shows an example map 700 having a geofence 705 that includes a geofence buffer zone 715 in accordance with an embodiment of the disclosure. The geofence 705 has an irregular shape in contrast to the polygon shape of the geofence 110 described above. The geofence buffer zone 715 in this example implementation is limited to a portion of the geofence 705. In another implementation, a geofence buffer zone may be provided along the entirety of the geofence 705.

Figure 8:
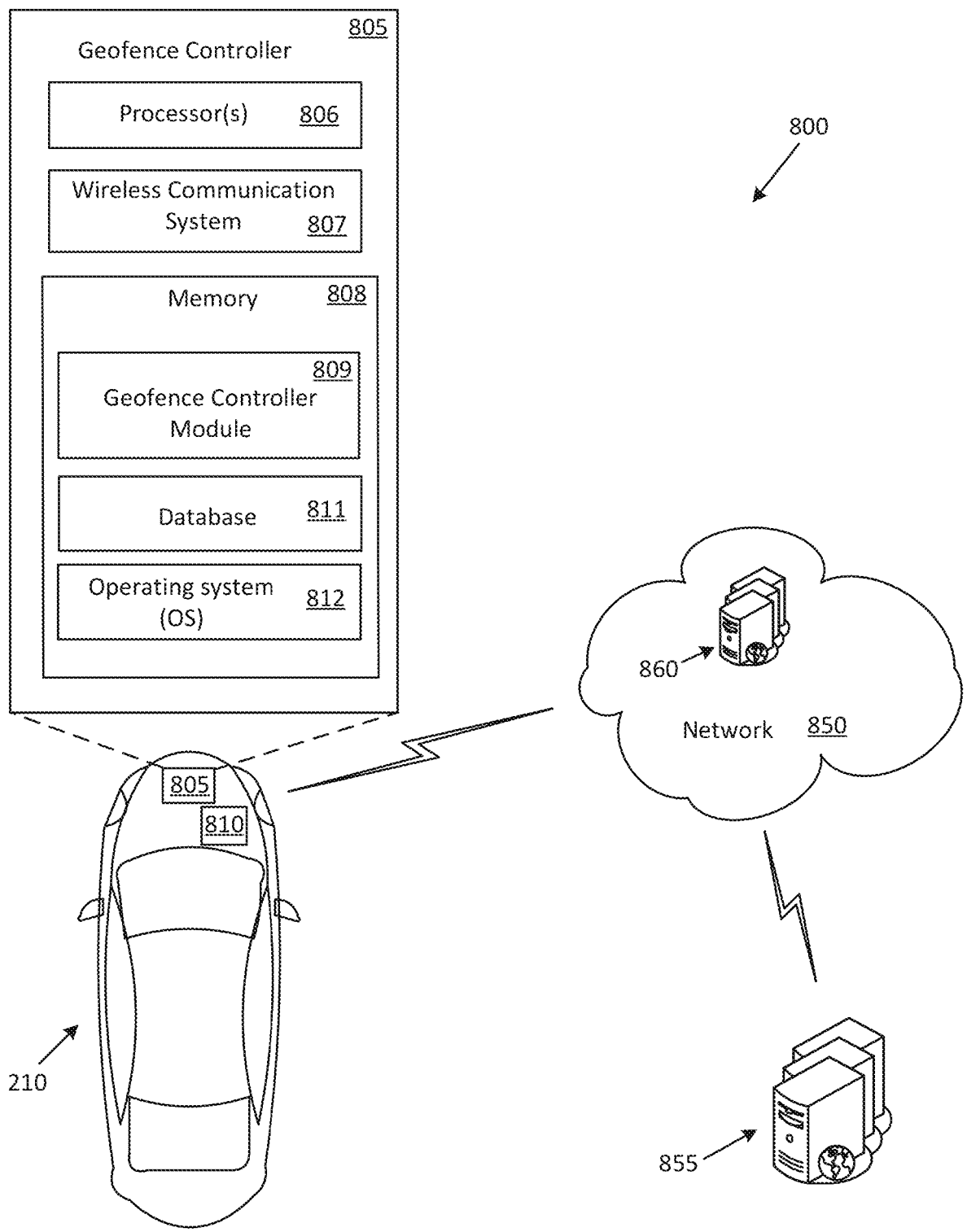
FIG. 8 shows an exemplary system for configuring and operating a geofence in accordance with the disclosure.

FIG. 8 shows an exemplary system 800 for configuring and operating a geofence in accordance with the disclosure. The vehicle 210, which is used here as an example vehicle for purposes of describing the operation of the system 800, may include various components, such as, for example, a vehicle computer 810, a geofence controller 805, and a wireless communication system. The vehicle computer 810 may perform various functions, such as controlling engine operations (fuel injection, speed control, emissions control, braking, etc.), managing climate controls (air conditioning, heating etc.), activating airbags, and issuing warnings (check engine light, bulb failure, low tire pressure, vehicle in blind spot, etc.).

The geofence controller 805 can be an independent unit in some implementations and may be incorporated into the vehicle computer 810 in some other implementations. When incorporated into the vehicle computer 810, some components (such as, for example, a processor) may be configured to execute operations related to the vehicle computer 105 as well as operations related to the geofence controller 805. In yet some other implementations, the vehicle computer 810 of a conventional vehicle may be modified to perform operations associated with the geofence controller 805. The modifications can include, for example, additional software and/or firmware that are executable by the processor to perform operations associated with the geofence controller 805.

The geofence controller 805 may communicate with various components inside as well as outside the vehicle 210 such as, for example a geofence controller 855 (that may be located in the automobile dealership in the examples described above), and/or a geofence controller 860 that is a cloud element located in a network cloud. The communications may be carried out by the wireless communication system of the vehicle 210 via the network 850.

The network 850 may include any one, or a combination of networks, such as a local area network (LAN), a wide area network (WAN), a telephone network, a cellular network, a cable network, a wireless network, and/or private/public networks, such as the Internet. For example, the network 850 may support communication technologies, such as Bluetooth®, cellular, UWB, near-field communication (NFC), Wi-Fi, Wi-Fi direct, Li-Fi, Acoustic or Ultrasonic communication, machine-to-machine communication, and/or man-to-machine communication.

The geofence controller 805 may include a processor 806, a wireless communication system 807, and a memory 808. The wireless communication system 807 can include various wireless communication elements that communicatively couple the geofence controller 805 to the network 850. The wireless communication system 807 may also include various wireless communication elements that enable the geofence controller 805 to transmit alerts such as, for example, an audible geofence exit alert to an audio system in the vehicle 210, visual geofence-related information (alert, boundary details, etc.) to an infotainment system in the vehicle, email and/or text to a smartphone of an occupant of the vehicle 210, and alerts to a remote entity, such as the geofence controller in the automobile dealership or a monitoring service.

The memory 808, which is one example of a non-transitory computer-readable medium, may be used to store an operating system (OS) 812, a database 811, and various code modules, such as a geofence controller module 809. The code modules are provided in the form of computer-executable instructions that can be executed by the processor 806 for performing various operations in accordance with the disclosure. The database 811 may be used to store various types of information such as, for example, details about the geofence 110 and one or more geofence buffer zones applicable to the geofence 110. This information may be accessed and used by the processor 806 for performing various actions in accordance with the disclosure. These actions may be carried out in certain instances even when communication between the geofence controller 805 and the network 850 is lost, sporadic, or unreliable. In some implementations, the geofence controller 805 may fetch information from devices such as, for example, the geofence controller 855, the geofence controller 860, and/or cloud storage elements. This information may be stored in the database 811.

The geofence control module 809 may be executed by the processor 806 for executing various operations in accordance with the disclosure, such as, for example, defining a geofence buffer zone, monitoring the movements of the vehicle 210 to detect geofence violations, and issuing geofence alerts (geofence exit alert, geofence entry alert, etc.).

The geofence controller 855 and/or the geofence controller 860 may include similar components as contained in the geofence controller 805. However, these components may be configured to support more than one geofence (in different areas, for example) and monitor movements of multiple vehicles traveling in one or more geofences.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device, such as a memory provided in the geofence controller 805 can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, personal communication devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method, comprising:
   receiving location information of a vehicle traveling on a road that is disposed about a segment of a geofence;
   identifying a margin of error present in the location information;
   redefining the segment of the geofence based on the margin of error present in the location information; and
   evaluating the location information to detect a geofence crossing with respect to the redefined segment of the geofence.

2. The method of claim 1, wherein redefining the segment of the geofence comprises providing a geofence buffer zone that extends to a first distance outside the segment of the geofence, the method further comprising:
   determining that the vehicle is traveling in a winding path; and
   desisting from issuing a geofence alert based on determining that the winding path does not cross the geofence buffer zone.

3. The method of claim 1, wherein redefining the segment of the geofence comprises providing a geofence buffer zone that extends a first distance outside the segment of the geofence, the method further comprising:
   issuing a geofence alert based on determining that the vehicle has traveled outside the geofence buffer zone.

4. The method of claim 3, further comprising:
   issuing the geofence alert based on a timing delay to confirm that the vehicle has traveled outside the geofence buffer zone.

5. The method of claim 4, wherein the timing delay comprises:
   detecting, at a first time, that the vehicle has traveled outside the geofence buffer zone; and
   issuing the geofence alert upon confirming, at a second time, that the vehicle has traveled outside the geofence buffer zone, the timing delay encompassing the first time and the second time.

6. The method of claim 1, wherein redefining the segment of the geofence comprises providing a geofence buffer zone that extends to a first distance outside the segment of the geofence, and the method further comprises:
   detecting a first location of the vehicle based on evaluating location information received at a first time;
   detecting a second location of the vehicle based on evaluating location information received at a second time; and
   issuing a geofence alert based on determining that the first location and the second location are outside the geofence buffer zone.

7. A controller of a geofence, the controller comprising:
a memory that stores computer-executable instructions; and
a processor configured to access the memory and execute the computer-executable instructions to at least:
receive location information of a first vehicle traveling on a road that is disposed about a segment of the geofence;
identify a first margin of error present in the location information;
provide a first geofence buffer zone that extends a first distance outside the segment of the geofence based on the first margin of error present in the location information;
detect the first vehicle traveling outside the first geofence buffer zone; and
issue a first geofence exit alert based on detecting the first vehicle traveling outside the first geofence buffer zone.

8. The controller of claim 7, wherein the processor is further configured to access the memory and execute additional computer-executable instructions to:
receive location information of a second vehicle traveling on the road that is disposed about the segment of the geofence;
identify a second margin of error present in the location information;
provide a second geofence buffer zone that extends a second distance outside the segment of the geofence;
detect the second vehicle traveling outside the second geofence buffer zone; and
issue a second geofence exit alert based on detecting the second vehicle traveling outside the second geofence buffer zone.

9. The controller of claim 8, wherein the second margin of error is less than the first margin of error and the second distance is less than the first distance.

10. The controller of claim 7, wherein the processor is further configured to access the memory and execute additional computer-executable instructions to:
determine that the first vehicle is traveling in a zig-zag path; and
desist from issuing the first geofence exit alert based on determining that the zig-zag path does not violate the first geofence buffer zone.

11. The controller of claim 7, wherein the processor is further configured to access the memory and execute additional computer-executable instructions to:
issue the first geofence exit alert based on providing a timing delay to confirm a violation of the first geofence buffer zone by the first vehicle.

12. The controller of claim 11, wherein the processor is further configured to access the memory and execute additional computer-executable instructions to:
detect, at a first time, the violation of the first geofence buffer zone by the first vehicle; and
issue the first geofence exit alert upon confirming, at a second time, that the first vehicle has traveled outside the first geofence buffer zone, the timing delay encompassing the first time and the second time.

* * * * *